Oct. 9, 1928.
H. BRIGGS
1,687,425
INTERNAL COMBUSTION MOTOR
Filed Aug. 12, 1927
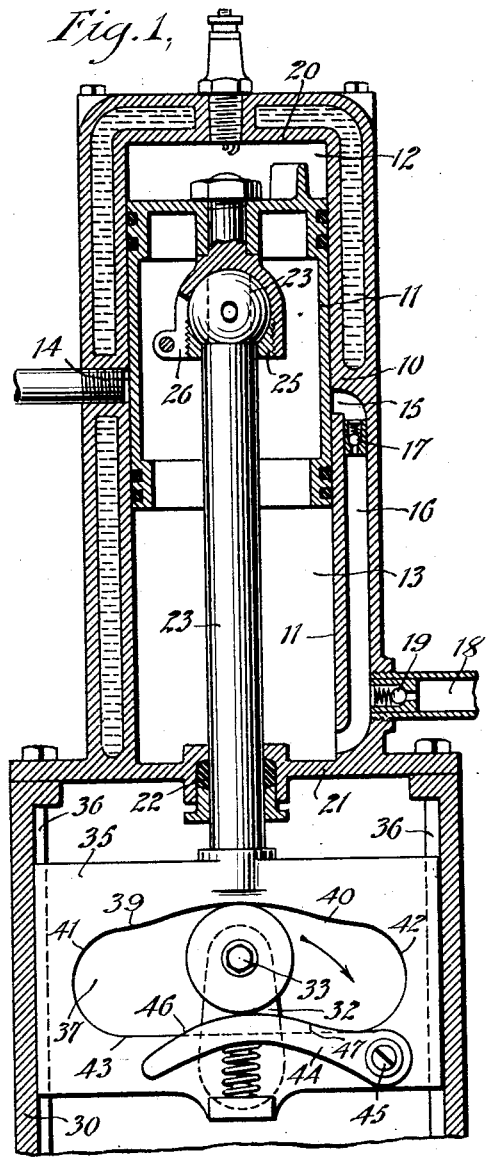
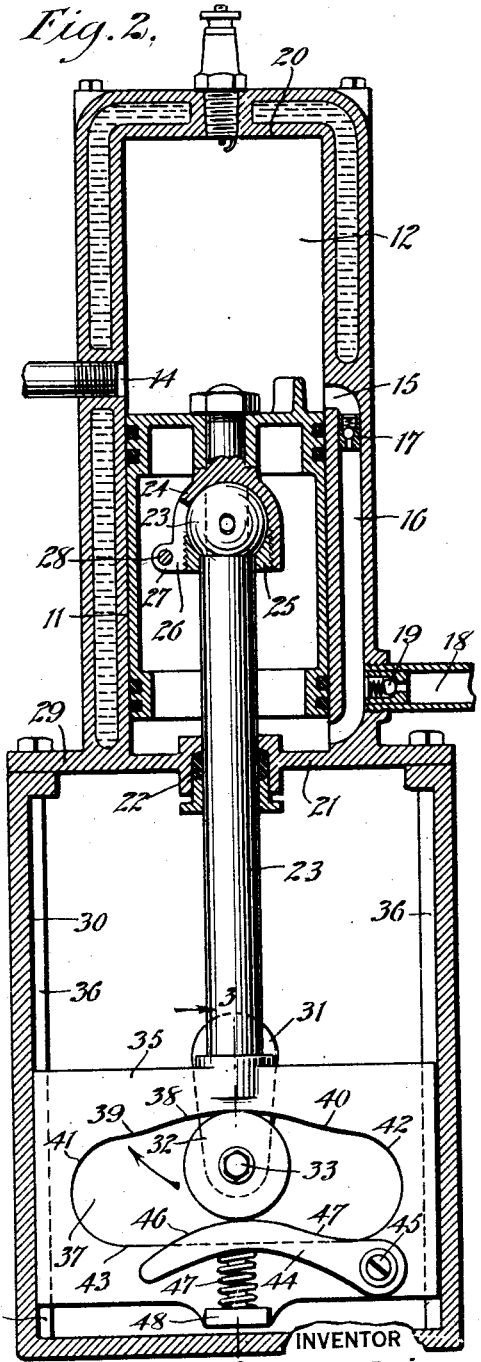
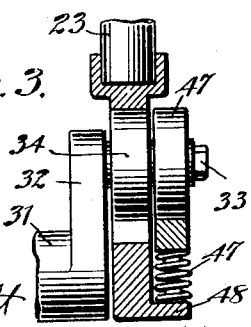
WITNESSES
INVENTOR
Henry Briggs
BY
ATTORNEY Patented Oct. 9, 1928.

1,687,425

UNITED STATES PATENT OFFICE.

HENRY BRIGGS, OF HASBROUCK HEIGHTS, NEW JERSEY.

INTERNAL-COMBUSTION MOTOR.

Application filed August 12, 1927. Serial No. 212,554.

This invention relates to prime movers and has particular reference to internal combustion motors preferably of the two-cycle type, the same being in the nature of an improvement over my prior United States Letters Patent No. 1,505,856, granted August 19, 1924.

The prior patent above mentioned has been found to possess certain defects and disadvantages particularly in the construction of the connection between the piston rod and crank shaft, it having been found that the cam slot lifting portion of the cam block after slight wear, tends to develop a knock which is both annoying and injurious.

In order to overcome this defect or objection, the present invention contemplates an improved connection between the crank shaft and piston rod which compensates for wear and insures a silent and effective operating engagement between the cam element of the crank shaft and the cam slot block at all times.

The invention further comprehends an improved adjustable ball and socket connection between the piston and the piston rod by virtue of which lost motion due to wear may be readily taken up and compensation for inequalities are allowed for.

Other objects reside in the comparative simplicity of construction of the improvement, the economy with which the same may be produced, and the general efficiency derived therefrom.

With the above recited and other objects in view, reference is had to the following description and accompanying drawings in which there is exhibited one example or embodiment of the invention, while the appended claims define the actual scope of the invention.

In the drawings—

Figure 1 is a vertical sectional view of the motor constructed in accordance with the invention and illustrating the position of the parts when the piston is at approximately top dead center;

Fig. 2 is a similar view illustrating the position of the parts when the piston it at approximately bottom dead center;

Fig. 3 is a fragmentary transverse sectional view taken approximately on the line 3—3 of Fig. 2.

Referring to the drawings by characters of reference, 10 designates a motor cylinder and 11 a piston which is mounted therein for reciprocation and which serves to divide the cylinder into upper and lower chambers 12 and 13. The upper chamber is provided with an exhaust port 14 and with an intake port 15, which latter port communicates with the lower chamber by a by-pass 16, in which by-pass is mounted a check valve 17 of any approved type. Communicating with the by-pass 16 is a fuel intake or supply pipe 18 provided with a check valve 19. The upper and lower ends of the cylinder are closed by cylinder heads 20 and 21, the latter provided with a stuffing box or packing gland 22, through which a piston rod 23 extends. At its upper end the piston rod is connected with the piston 11 by a ball-and-socket joint, the ball 23 being carried by the piston rod and the socket rod 24 by the piston. An annular screw plug 25 is threaded into the socket for adjustment to compensate for wear and take up lost motion of the joint. The socket member is split at 26 and is provided with apertured ears 27 through which a retaining bolt 28 extends to lock the screw plug 25 in its adjusted positions. The cylinder block is provided with a flange 29 at its lower end which is bolted to a crank case 30 through which a crank shaft 31 extends. The crank shaft is provided with a crank arm 32 having a spindle 33 eccentric to the crank shaft and upon which a cam roller 34 is journaled. The piston rod 23 has rigidly secured to its lower end a cam block 35 which is mounted for vertical reciprocation upon guides 36 in the crank case. The cam block is provided with a cam slot 37 defining a central arcuate curved wall 38 joined by compound curved walls 39 and 40 to substantially semi-circular curved end walls 41 and 42, the lower wall 43 of the slot being substantially straight. The power stroke or down stroke of the piston will maintain the walls 38, 40 and 42 in engagement with the cam roller. In order to provide means for taking up wear and maintaining the cam roller in engagement with the walls 41 and 39 on the up stroke, an arm 44 is fulcrumed at 45 to the cam block and is provided with an arcuate upper surface 46 which engages with a roller 47 journaled on the spindle 33. A coiled expansion spring 47 is interposed between an outwardly projecting lip 48 on the cam block and the under surface of the arm 44 to impinge the arcuate surface 46 against the roller 47.

From the foregoing it will thus be seen that an improved connection between the crank shaft and piston rod of an internal combustion motor of the character set forth, has been devised which insures a silent and effective operative engagement of the parts at all times.

What is claimed is:

1. In an internal combustion motor, a cylinder, a piston movable therein, a crank shaft, and a connection between the piston and the crank shaft including a cam slotted block attached to the piston, a cam roller carried by the crank shaft, and a tensioned means carried by the cam block for maintaining the cam roller in engagement with the walls of the cam slot.

2. In an internal combustion motor, a cylinder, a piston movable therein, a crank shaft, and a connection between the piston and the crank shaft including a cam slotted block attached to the piston, a cam roller carried by the crank shaft, and a spring-pressed arm carried by the cam block for maintaining the cam roller in engagement with the walls of the cam slot.

3. In an internal combustion motor, which includes a cylinder, a piston movable therein, a piston rod connected with the piston, a crank shaft, a cam roller eccentrically mounted on the crank shaft, and a cam slotted block carried by the piston, having a wall portion formed concentric with the path of travel of the crank shaft; tensioned means carried by the cam block for maintaining the cam roller in engagement with the cam slot wall upon upward movement of the piston.

4. In an internal combustion motor, which includes a cylinder, a piston movable therein, a piston rod connected with the piston, a crank shaft, a cam roller eccentrically mounted on the crank shaft, and a cam slotted block carried by the piston, having a wall portion formed concentric with the path of travel of the crank shaft; tensioned means carried by the cam block for maintaining the cam roller in engagement with the cam slot wall upon upward movement of the piston, said means consisting of a spring-pressed arm having a convex surface.

5. In an internal combustion motor, which includes a cylinder, a piston movable therein, a piston rod having an adjustable ball-and-socket connection with the piston, a crank shaft, a cam roller eccentrically mounted on the crank shaft, and a cam slotted block carried by the piston, having a wall portion formed concentric with the path of travel of the crank shaft; tensioned means carried by the cam block for maintaining the cam roller in engagement with the cam slot wall upon upward movement of the piston.

6. In an internal combustion motor, which includes a cylinder, a piston movable therein, a piston rod connected with the piston, a crank shaft, a cam roller eccentrically mounted on the crank shaft, and a cam slotted block carried by the piston, having a wall portion formed concentric with the path of travel of the crank shaft; tensioned means carried by the cam block for maintaining the cam roller in engagement with the cam slot wall upon upward movement of the piston, said means consisting of a spring-pressed arm having a convex surface, and a roller mounted on the same axis with the cam roller.

7. In a motor and in combination with a cam roller on the crank shaft thereof, a cam slotted block, the slot in said cam slotted block being formed with a lifting wall portion, a power wall portion, and an idle wall portion interposed with respect to the lifting wall portion and the power wall portion, said idle wall portion being concentric with the path of travel of the crank shaft throughout its length, and tensioned means for maintaining said cam roller in engagement with said wall portions of the cam slot.

Signed at New York, in the county of New York and State of New York this 11th day of August, A. D. 1927.

HENRY BRIGGS.